US012755357B2

(12) United States Patent
Nittka et al.

(10) Patent No.: US 12,755,357 B2
(45) Date of Patent: Oct. 6, 2026

(54) METHODS, APPARATUSES, SYSTEMS AND COMPUTER-READABLE MEDIUMS FOR GRAPHICAL PRESENTATION OF DISTORTION LEVELS FOR USE IN MEDICAL IMAGING

(71) Applicant: Siemens Healthineers AG, Forchheim (DE)

(72) Inventors: Mathias Nittka, Baiersdorf (DE); Gregor Körzdörfer, New York, NY (US); Mahesh Bharath Keerthivasan, Tucson, AZ (US)

(73) Assignee: Siemens Healthineers AG, Forchheim (DE)

( * ) Notice: Subject to any disclaimer, the term of this patent is extended or adjusted under 35 U.S.C. 154(b) by 285 days.

(21) Appl. No.: 18/594,186

(22) Filed: Mar. 4, 2024

(65) Prior Publication Data

US 2025/0278822 A1 Sep. 4, 2025

(51) Int. Cl.

| | |
|---|---|
| ***G06K 9/00*** | (2022.01) |
| ***G06T 5/75*** | (2024.01) |
| ***G06T 5/80*** | (2024.01) |
| ***G06T 7/00*** | (2017.01) |

(52) U.S. Cl.

CPC .................. *G06T 5/80* (2024.01); *G06T 5/75* (2024.01); *G06T 7/0012* (2013.01); *G06T 2207/10088* (2013.01)

(58) Field of Classification Search

CPC G06T 5/80; G06T 5/75; G06T 7/0012; G06T 2207/10088; G06T 7/0002; G06T 2207/30168

See application file for complete search history.

(56) References Cited

U.S. PATENT DOCUMENTS

| | | | | |
|---|---|---|---|---|
| 7,843,194 B2 * | 11/2010 | Kassai | A61B 5/055 | 324/309 |
| 7,952,356 B2 * | 5/2011 | Koch | G01R 33/243 | 324/309 |
| 8,131,047 B2 * | 3/2012 | Li | G01R 33/4824 | 382/128 |

(Continued)

FOREIGN PATENT DOCUMENTS

| | | | | |
|---|---|---|---|---|
| EP | 4273569 A1 * | 11/2023 | G01R 33/5608 |
| KR | 20190081656 A * | 7/2019 | G06T 5/001 |

OTHER PUBLICATIONS

Kaushik, S. Sivaram, Cathy Marszalkowski, and Kevin M. Koch. "External calibration of the spectral coverage for three- dimensional multispectral MRI." Magnetic resonance in medicine 76.5 (2016): 1494-1503.

*Primary Examiner* — Shervin K Nakhjavan

(57) ABSTRACT

A system for generating a graphical presentation of one or more distortion levels include at least one memory and at least one processor. The at least one memory is configured to store instructions and the at least one processor is configured to execute the instructions to cause the system to perform a distortion mapping sequence to generate a field map. The field map includes spatial information related to anticipated distortions caused by variations of a static magnetic field. The at least one processor is further configured to cause the system to segment the spatial information into one or more distortion levels and display a graphical representation including the one or more distortion levels.

23 Claims, 3 Drawing Sheets

(56) References Cited

U.S. PATENT DOCUMENTS

| | | | | |
|---|---|---|---|---|
| 8,502,538 | B2 * | 8/2013 | Dannels | G01R 33/243<br>324/309 |
| 9,513,359 | B2 * | 12/2016 | Koch | G01R 33/56563 |
| 10,029,121 | B2 * | 7/2018 | Li | A61N 5/1039 |
| 10,191,134 | B2 * | 1/2019 | Pfeffer | G01R 33/56563 |
| 10,234,521 | B2 * | 3/2019 | Liu | A61B 5/055 |
| 10,543,361 | B2 * | 1/2020 | Ramani | A61N 1/0534 |
| 10,638,949 | B2 * | 5/2020 | Koch | A61B 5/055 |
| 10,718,838 | B2 | 7/2020 | Koch et al. | |
| 10,725,133 | B2 * | 7/2020 | Quist | G01R 33/5608 |
| 11,009,578 | B2 * | 5/2021 | Gui | G01R 33/5659 |
| 12,174,281 | B2 * | 12/2024 | Solomon | A61B 5/055 |
| 12,245,848 | B2 * | 3/2025 | Weiss | A61B 5/055 |
| 12,313,716 | B2 * | 5/2025 | Zhang | G01R 33/5616 |
| 2025/0005715 | A1 * | 1/2025 | Raymond | G06T 5/50 |
| 2025/0044386 | A1 * | 2/2025 | Schmidt | G01R 33/3875 |
| 2025/0138121 | A1 * | 5/2025 | Wallace | G01R 33/543 |
| 2025/0264565 | A1 * | 8/2025 | Zhou | G01R 33/5608 |

* cited by examiner

METHODS, APPARATUSES, SYSTEMS AND COMPUTER-READABLE MEDIUMS FOR GRAPHICAL PRESENTATION OF DISTORTION LEVELS FOR USE IN MEDICAL IMAGING

TECHNICAL FIELD

Example embodiments relate to graphical presentations of distortion levels in medical imaging.

BACKGROUND

Magnetic field distortion levels are known to impact image quality in medical imaging. Magnetic field distortion may be caused by metal implants and may be unique to each patient.

SUMMARY

In at least one example embodiment, a system for generating a graphical presentation of one or more distortion levels is described. The system may include at least one memory and at least one processor. The at least one memory may be configured to store instructions and the at least one processor may be configured to execute the instructions to cause the system to perform a distortion mapping sequence to generate a field map. The field map may include spatial information related to anticipated distortions caused by variations of a static magnetic field. The at least one processor may be further configured to cause the system to segment the spatial information into one or more distortion levels and display a graphical representation including the one or more distortion levels.

In at least one example embodiment, the one or more distortion levels may include a first distortion level and a second distortion level. The first distortion level may include field offsets of greater than a first threshold and less than a second threshold and the second distortion level may include first offsets greater than the second threshold. The first threshold may be about 200 Hz and the second threshold may be about 2 kHz.

In at least one example embodiment, the at least one processor may be configured to execute the instructions to further cause the system to generate a localizer image based on a localizer scan and generate the graphical representation based on the one or more distortion levels and the localizer image. The graphical representation of the field map may be an image generated by overlaying the one or more distortion levels on the localizer image.

In at least one example embodiment, each of the one or more distortion levels may be displayed in the field map.

In at least one example embodiment, each of the one or more distortion levels may be displayed in a distinct color.

In at least one embodiment the field map may be masked based on thresholding using an output of the distortion mapping sequence.

In at least one example embodiment, the at least one processor may be configured to execute the instructions to further cause the system to preconfigure the distortion mapping sequence based on at least one of an expected maximum off-resonance of the field map, a field strength, or a body part to be imaged.

In at least one example embodiment, the one or more distortion levels may be metal distortion levels.

At least one other example embodiment provides a method for generating a graphical presentation of one or more distortion levels. The method may include performing a distortion mapping sequence to generate a field map. The field map may include spatial information related to anticipated distortions caused by variations of a static magnetic field. The method may further include segmenting the spatial information into one or more distortion levels and displaying a graphical representation including the one or more distortion levels.

In at least one example embodiment, the one or more distortion levels may include a first distortion level and a second distortion level. The first distortion level may include field offsets of greater than a first threshold and less than a second threshold and the second distortion level may include first offsets greater than the second threshold. The first threshold may be about 200 Hz and the second threshold may be about 2 kHz.

In at least one example embodiment, the method may further include generating a localizer image based on a localizer scan and generating the graphical representation based on the one or more distortion levels and the localizer image. The graphical representation of the field map may be an image generated by overlaying the one or more distortion levels on the localizer image.

In at least one example embodiment, each of the one or more distortion levels may be displayed in the field map.

In at least one example embodiment, each of the one or more distortion levels may be displayed in a distinct color.

In at least one embodiment, the field map may be masked based on thresholding using an output of the distortion mapping sequence.

In at least one example embodiment, the method may further include preconfiguring the distortion mapping sequence based on at least one of an expected maximum off-resonance of the field map, a field strength, or a body part to be imaged.

In at least one example embodiment, the one or more distortion levels may be metal distortion levels.

At least one other example embodiment provides a non-transitory computer readable medium storing computer readable instructions that, when executed by one or more processors of a system, cause the system to perform a method for generating a graphical presentation of one or more distortion levels. The method may include performing a distortion mapping sequence to generate a field map. The field map may include spatial information related to anticipated distortions caused by variations of a static magnetic field. The method may further include segmenting the spatial information into one or more distortion levels and displaying a graphical representation including the one or more distortion levels.

At least one other example embodiment provides a device for generating a graphical presentation of one or more distortion levels. The device may include means for performing a distortion mapping sequence to generate a field map. The field map may include spatial information related to anticipated distortions caused by variations of a static magnetic field. The device may further include means for segmenting the spatial information into one or more distortion levels and displaying a graphical representation including the one or more distortion levels.

At least one other example embodiment provides a system for generating a graphical presentation of one or more distortion levels is described. The system may include at least one memory and at least one processor. The at least one memory may be configured to store instructions and the at least one processor may be configured to execute the instructions to cause the system to perform a distortion mapping sequence to generate a field map. The field map may include spatial information related to anticipated distortions caused by variations of a static magnetic field. The at least one processor may be further configured to cause the system to segment the spatial information into one or more distortion levels.

In at least one example embodiment, the at least one processor may be further configured to execute the instructions to cause the system to adjust one or more imaging protocols based on the one or more distortion levels. The imaging protocols may be magnetic resonance imaging protocols.

In at least one example embodiment, the distortion levels may be determined for use in medical imaging.

At least one other example embodiment provides a system including the system for generating a graphical presentation of one or more distortion levels and an acquisition device configured to obtain magnetic resonance images based on the magnetic resonance imaging protocols.

At least one other example embodiment provides a non-transitory computer readable medium storing computer readable instructions that, when executed by one or more processors of a system, cause the system to perform a method for generating a graphical presentation of one or more distortion levels. The method may include performing a distortion mapping sequence to generate a field map. The field map may include spatial information related to anticipated distortions caused by variations of a static magnetic field. The method may further include segmenting the spatial information into one or more distortion levels.

At least one other example embodiment provides a device for generating a graphical presentation of one or more distortion levels. The device may include means for performing a distortion mapping sequence to generate a field map. The field map may include spatial information related to anticipated distortions caused by variations of a static magnetic field. The device may further include means for segmenting the spatial information into one or more distortion levels.

BRIEF DESCRIPTION OF THE DRAWINGS

Other objects and features of the present invention will become apparent from the following detailed description considered in conjunction with the accompanying drawings.

The drawings, however, are only examples and schematics solely for the purpose of illustration and do not limit the present invention. In the drawings.

DETAILED DESCRIPTION

Figure 1A:
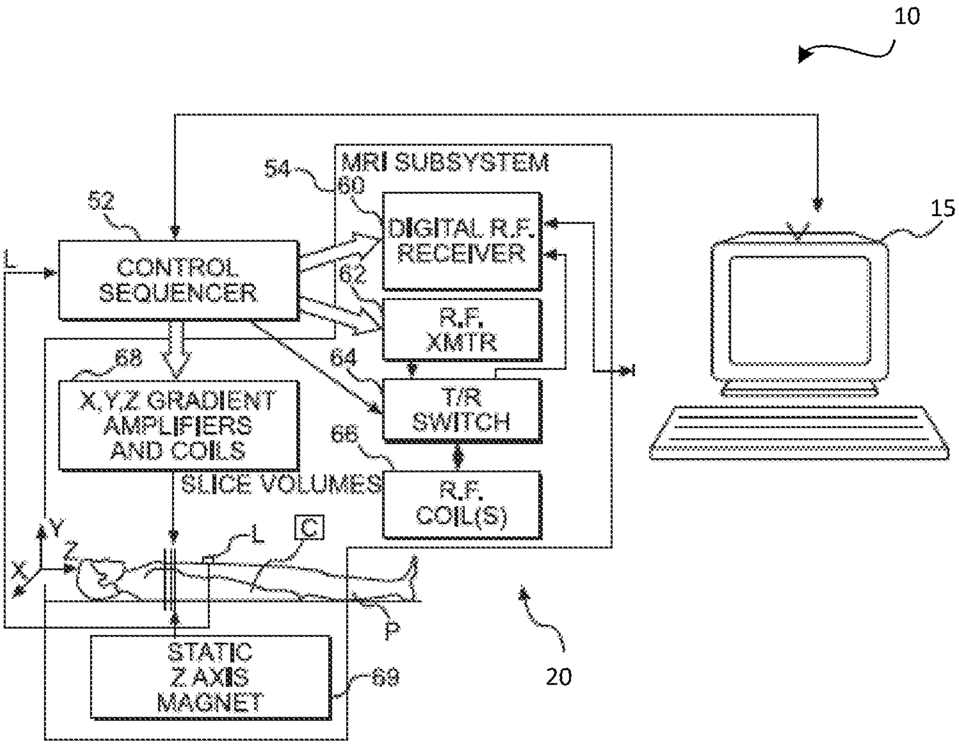
FIG. 1A is an illustration of a system for implementing methods according to example embodiments.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Independent of the grammatical term usage, individuals with male, female or other gender identities are included within the term.

One or more example embodiments described herein relate to methods, apparatuses, systems, and/or non-transitory computer-readable mediums configured to determine, present, and/or provide a correction based on a distortion level present in a portion (e.g., region of interest (ROI)) of a patient to be scanned. In at least one example embodiment, the systems and methods described herein relate to medical imaging and magnetic resonance (MR) imaging in particular. In some example embodiments, scan parameters for a medical image acquisition may be adjusted based on distortion levels that may be present in a desired portion of a patient to be scanned. Thus, one or more example embodiments described herein may enable increased image quality and/or increased patient throughput.

Figure 1B:
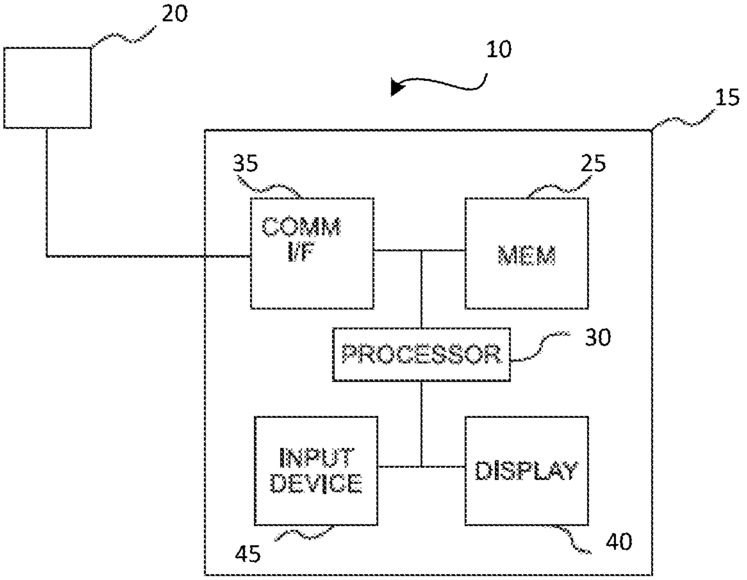
FIG. 1B is a block diagram illustrating an example embodiment of the system shown in FIG. 1A.

FIG. 1A is an illustration of a system for implementing methods according to example embodiments described herein. FIG. 1B is a block diagram illustrating an example embodiment of the system shown in FIG. 1A. Although one or more example embodiments may be described herein with regard to the systems shown in FIGS. 1A and 1B, example embodiments should not be limited to these examples.

Referring to FIGS. 1A and 1B, a system 10 may include an information processing device 15 and an acquisition device 20. The acquisition device 20 includes an MRI real-time control sequencer 52 and an MRI subsystem 54. The MRI subsystem 54 may include XYZ magnetic gradient coils and associated amplifiers 68, a static Z-axis magnet 69, a digital radiofrequency ("RF") transmitter 62, a digital RF receiver 60, a transmit/receive switch 64, and RF coil(s) 66. The acquisition device 20 may include additional or fewer components in some example embodiments, and may be configured to image a patient.

The MRI subsystem 54 may be controlled in real-time by the MRI real-time control sequencer 52 to generate and measure magnetic field and radio frequency emissions that stimulate nuclear magnetic resonance ("NMR") phenomena in an object P (e.g., a human or other living body) to be imaged.

The information processing device 15 may implement a method for processing medical data, such as medical image data. As discussed in more detail below, one or more information processing devices such as the information processing device 15 may be configured to implement any or all of the example embodiments described herein.

In FIGS. 1A and 1B, the acquisition device 20 is shown as a separate unit from the information processing device 15. It is, however, possible to integrate the information processing device 15 as part of the acquisition device 20.

The information processing device 15 may include a memory 25, processing circuitry including at least one processor such as processor 30, a communication interface 35 and/or an input device 40. The memory 25 may include various special purpose program code including computer executable instructions which may cause the processor 30 of the information processing device 15 to perform one or more of the methods according to example embodiments described herein. The acquisition device 20 may provide the medical data to the information processing device 15 via the input device 40. In some example embodiments, the information processing device 15 may additionally include a display 45 that may be configured to output information about one or more of an imaging process, the information processing device 15, or the acquisition device 20.

Figure 2:
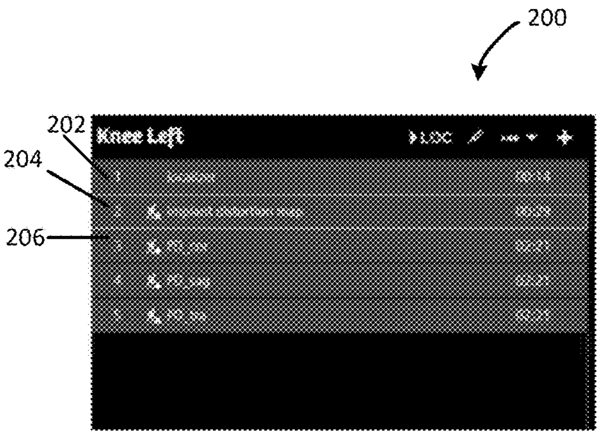
FIG. 2 is an illustration of a graphical user interface (GUI) showing a scan program according to example embodiments.

FIG. 2 is an illustration of a graphical user interface (GUI) 200 showing a scan program according to example embodiments.

A scan program may include one or more steps in order to perform a scan of a desired portion of a patient. The scan program may include a first step 202 of a localizer scan. The localizer scan may produce a localizer image of the scanned portion of the patient. The localizer scan may be performed by methods well-known in the art.

The scan program may also include a second step 204 of a distortion mapping sequence. In at least one example embodiment, the distortion mapping sequence may be an implant distortion mapping sequence. The distortion mapping sequence may scan the desired portion of the patient to calculate an off-resonance map. An off-resonance map may also be referred to as a field map and/or a $B_0$-map of a local static magnetic field. In the context of imaging patients with implants, off-resonance is caused by a susceptibility gradient between the implant and human tissue.

In particular, the distortion mapping sequence may begin by measuring a static magnetic field of the desired portion of the patient to obtain a field map. In at least one example embodiment, the field map may include spatial information related to anticipated distortions caused by variations of a static magnetic field. Mapping the static magnetic field may result in a $B_0$-map. Details of an example of a method of mapping a static magnetic field may be found in Kaushik S S, Marszalkowski C, Koch K M. External calibration of the spectral coverage for three-dimensional multispectral MRI. *Magn Reson Med.* 2016; 76 (5):1494-1503. doi: 10.1002/mrm.26065 which is incorporated herein by reference in its entirety. An example method of mapping a static magnetic field may use spectrally selective RF pulses to excite several frequency bins separately and acquire a signal of each bin individually. Images of each of the frequency bins may be used to generate a field map and may be composed to form an image. In at least one example embodiment, the static magnetic field may be distorted by an implant in or near the desired portion of the patient to be imaged. In at least one example embodiment, the implant may be a metal implant.

In at least one example embodiment, the spatial information of the $B_0$-map may be segmented into one or more distortion levels indicating frequency offsets in the desired portion of the patient. For example, if a patient has a hip arthroplasty implant, the spatial information of the $B_0$-map may show frequency offsets in the vicinity of the hip arthroplasty implant. In at least one example embodiment, the spatial information of the $B_0$-map may be divided into one or more distinct distortion levels. For example, the spatial information of the $B_0$-map may be divided into two distortion levels with a first distortion level including field offsets of greater than a first threshold and less than a second threshold and a second distortion level including field offsets of greater than the second threshold. In at least one example embodiment the first threshold may be 200 Hertz (Hz) the second threshold may be 2 kHz. In at least one example embodiment, a field offset greater than 200 Hz and less than 2 kHz may be considered mild distortion and a field offset greater than 2 kHz may be considered severe distortion. In at least one example embodiment, the one or more distortion levels may be metal distortion levels or other sources of off-resonances which may deteriorate image quality. Although discussed herein with regard to thresholds of 200 Hz and 2 kHz, example embodiments should not be limited to this example.

In at least one example embodiment, if the field map includes discontinuities such as a hole, the hole may be adjusted based on the field map. A field map may include a hole as a result of an error in the distortion mapping sequence and/or postprocessing such as masking. In at least some example embodiments, errors in the distortion mapping sequence may include inaccurate field map estimations due to lack of signal or strong local susceptibility gradients near an implant or near regions without signal where a field map cannot be estimated. For example, if there is a hole in a first distortion level of the field map, the hole may be removed and may be included in the first distortion level. This may result in a modified field map that does not include any holes. Additionally, the field map may be denoised and/or smoothed to produce a modified field map.

In at least one example embodiment, the distortion levels may be used to determine imaging techniques. The imaging techniques may be medical imaging techniques. In particular, the imaging techniques may be MR imaging techniques. For example, high bandwidth adapted sequences may be relatively well-suited for imaging a region with mild distortion while regions with severe distortion may require more dedicated scanning techniques such as multi-spectral-imaging sequences. Thus, the spatial information of the $B_0$-map may be used to modify settings for the remaining steps of the scan program. For example, the $B_0$-map may be used to choose an imaging technique that will be best suited for the desired portion of the patient to be imaged based on the distortion that is created by an implant on or near the desired portion of the patient to be scanned.

In at least one example embodiment, the second step 204 may additionally include outputting the $B_0$-map. The $B_0$-map may be output to a graphical user interface (GUI). For example, an image showing the one or more distortion levels may be output on the GUI. The $B_0$-map may be either a grayscale image or a colored map. Alternatively and/or additionally, the distortion levels from the $B_0$-map may be used to output an image of the portion of the patient to be imaged including the distortion levels. For example, the one or more distortion levels may be overlayed onto the localizer image to create a graphical representation for display on the GUI. In at least one example embodiment, the distortion levels that are overlayed onto the localizer image may be the maximum intensity projection ("MIP") of the distortion levels to show the full extent of distortions from the implant on a single image. In particular, the distortion levels may be determined for a 3D volume which may result in a 3D field map. In at least one example embodiment, a MIP may be performed along a slice direction or along a normal vector of the localizer image. In at least one example embodiment, the 3D field map may be reformatted in any orientation.

In at least one example embodiment, the distortion mapping sequence may be configured or preconfigured based on expected maximum off-resonance of the field map. The distortion mapping sequence may be configured or preconfigured based on different field strengths such as 1.5 T, 3 T, etc., based on body regions, or based on any additional information about an implant in a patient's body. In at least one example embodiment, preconfiguring may help to make the distortion mapping sequence more sensitive to detect smaller implants. Preconfiguring may also help to make the distortion mapping sequence more precise or reliable in the presence of implants exhibiting strong distortions. The distortion mapping sequence may be more precise or reliable based on an increased spatial resolution resulting from the preconfiguring. Additionally, preconfiguring may also help to reduce a scan time of a distortion mapping sequence and/or result in less imparted RF energy due to fewer RF pulses.

In at least one example embodiment, the second step 204 may be automatically performed after the first step 202 is completed. Alternatively, an operator may select the second step 204 from the GUI 200 after the first step 202 is completed.

The scan program may conclude with at least one third step 206 of one or more imaging sequences. The one or more imaging sequences may be medical imaging sequences that are used to generate a medical image of at least a portion of a patient. In at least some example embodiments there may be three imaging sequences following the implant distortion mapping sequence. The imaging sequences may be configured to image the desired portion of the patient following the determination of any distortion levels present in the desired portion of the patient. The imaging sequences may be configured based on the $B_0$-map and the distortion levels generated in the second step 204.

Figure 3:
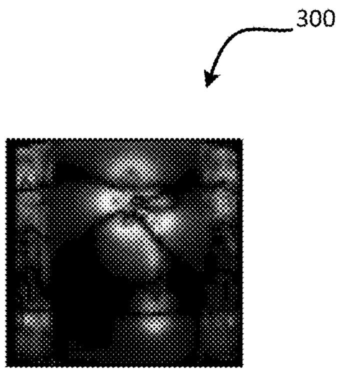
FIG. 3 is an illustration of a field map from a hip arthroplasty implant according to an example embodiment.

FIG. 3 is an illustration of a $B_0$-map 300 from a hip arthroplasty implant according to an example embodiment. In at least one example embodiment, the $B_0$-map may have been generated at the second step 204 of the scan program. The bright pixels of the $B_0$-map represent high frequency offsets and the dark pixels represent low frequency offsets.

Figure 4:
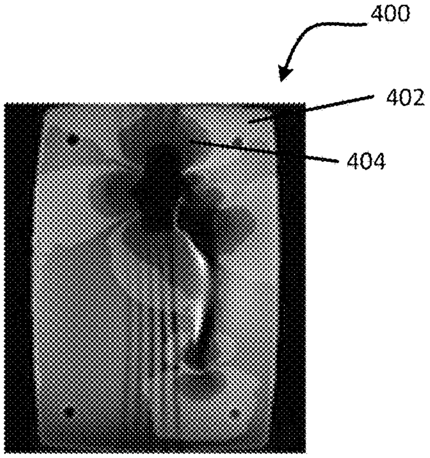
FIG. 4 is an illustration of a segmented field map of the hip arthroplasty implant of FIG. 3 according to an example embodiment

FIG. 4 is an illustration of a segmented field map 400 of the hip arthroplasty implant of FIG. 3 according to an example embodiment. The segmented field map 400 shows two distortion levels. A first distortion level 402 includes offsets between a first threshold and a second threshold and a second distortion level 404 includes offsets greater than the second threshold. In at least one example embodiment, the first threshold is 500 Hz and the second threshold is 1000 Hz. However, example embodiments should not be limited to these example values.

Figure 5:
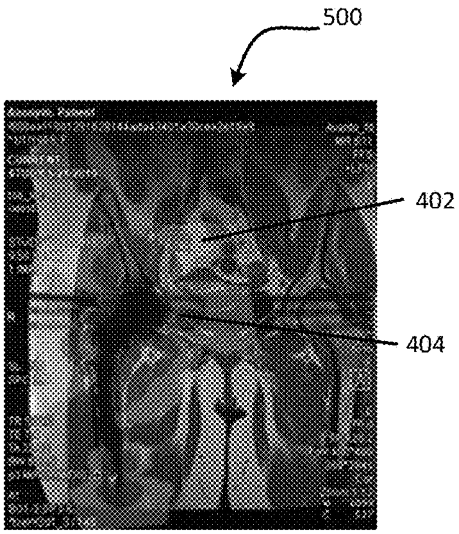
FIG. 5 is an illustration of a localizer image of the hip arthroplasty implant including the distortion levels from the field map of FIG. 3 according to an example embodiment.

FIG. 5 is an illustration of a localizer image 500 including a graphical overlay of the first distortion level 402 and the second distortion level 404. The localizer image 500 shows a maximum intensity projection of the distortion levels to show a complete impact of distortions from an implant. In at least one example embodiment, each of the first distortion level and the second distortion level may be shown in a distinct color on the localizer image. In other example embodiments, the first distortion level and the second distortion level may be shown by a unique display style such as different shading for example.

In at least one example embodiment, the field map may be masked based on thresholding using an output of the distortion mapping sequence. This masking may be based on an intensity of an image that is generated alongside the field map. The masking may be done by thresholding using a certain percentile of the intensities that are included in the image that is generated alongside the field map.

In at least one example embodiment, the localizer image 500 may be used to visualize the one or more distortion levels relative to a specific patient anatomy. For example, if an area proximate to a region in the second distortion level 404 is to be imaged, one or more dedicated imaging sequences may be required due to the distortion level. However, if an area outside of both the first distortion level 402 and the second distortion level 404 is to be imaged, regular imaging sequences may be used as there are no significant distortions present.

Figure 6:
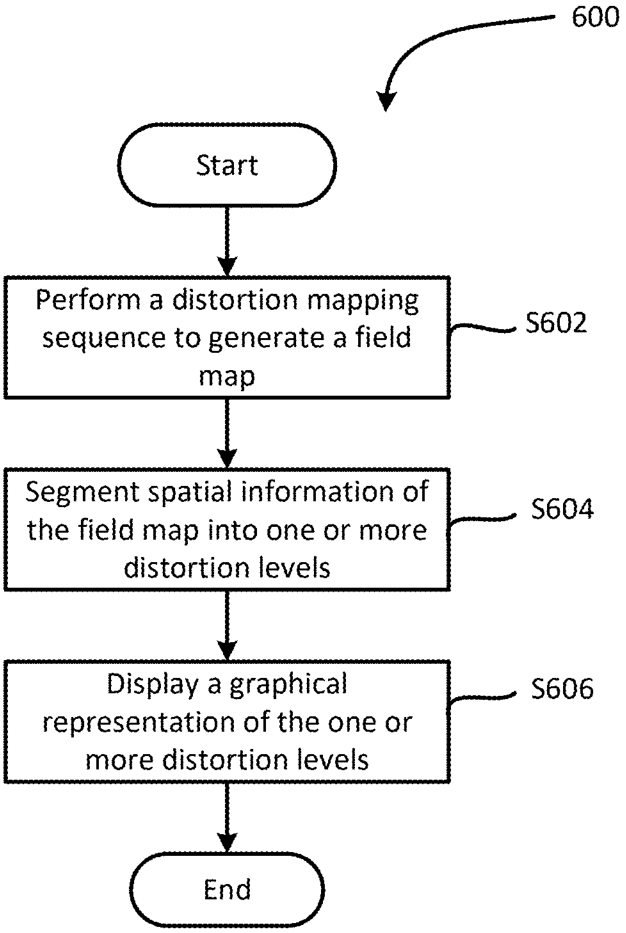
FIG. 6 is a flow chart illustrating a method of generating a graphical presentation of a distortion level according to an example embodiment.

FIG. 6 is a flow chart illustrating a method 600 of generating a graphical presentation of one or more distortion levels according to an example embodiment. The method 600 may be analogous to the second step 204 of FIG. 2 described above.

The method 600 may start at step S602 where a processor such as the processing device 15 initiates a distortion mapping sequence to generate a field map. The distortion mapping sequence may be analogous to at least a portion of the second step 204 described above with reference to FIG. 2. Thus, a desired portion of a patient is scanned by an imaging device and the processing device 15 generates a field map from the scan. Additional details of generating the field map are described above with reference to FIG. 2.

At S604 the processing device 15 segments spatial information of the field map into one or more distortion levels. For example, the spatial information of the field map may be divided into two distortion levels with a first distortion level including field offsets of greater than a first threshold and less than a second threshold and a second distortion level including field offsets of greater than the second threshold. In at least one example embodiment, the first threshold is 500 Hz and the second threshold is 1000 Hz. In another example embodiment, the first threshold may be 200 Hz the second threshold may be 2 kHz. However, example embodiments should not be limited to these example values.

At S606 a graphical user interface displays a graphical representation of the one or more distortion levels. The graphical representation of the one or more distortion levels may be the localizer image 500 including the graphical overlay of the first distortion level 402 and the second distortion level 404.

In at least one example embodiment, the one or more distortion levels may be used to determine how an implant or other item causing a field distortion may impact a medical image. For example, a medical image may be configured with a first set of parameters if there is no field distortion present for the portion of the patient to be imaged. When no field distortion is present, standard imaging protocols, such as standard fat saturation methods, may be used similar to a case where no implant is present. If there is a mild distortion present for the portion of the patient to be imaged a second set of parameters may be used to image the patient. In a mild distortion case, standard fat saturation methods may fail.

Thus, sequences with alternative fat saturation techniques, such as Dixon or short tau inversion recovery ("STIR"), may be used in place of standard fat saturation approaches. Additionally, sequences using high bandwidth RF pulses and high bandwidth readout may be appropriate as well as View Angle Tilting techniques. If a severe distortion is present for the portion of the patient to be imaged a third set of parameters may be used to image the patient. For severe distortions, multi spectral imaging sequences, such as slice encoding for metal-artifact reduction ("SEMAC"), may be used to correct for field distortions that cannot be handled by the methods described above for no field distortion and mild distortion. The first set of parameters, the second set of parameters, and the third set of parameters may all be different to account for the level of distortion present. Adjusting the parameters for the medical imaging based on the distortion level results in increased image quality because the imaging parameters are patient specific.

The systems and methods described herein enable increased image quality of MR medical images by allowing scan parameters to be optimized based on distortion levels that may be present in a desired portion of a patient to be scanned. The systems and methods may also improve patient throughput by reducing a risk of a patient having to reschedule due to lack of implant information or insufficient image quality due to an implant.

Although the present invention has been described in detail with reference to example embodiments, the present invention is not limited by the disclosed examples from which the skilled person is able to derive other variations without departing from the scope of the invention.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific structural and functional details disclosed herein are merely representative for purposes of describing example embodiments. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, at least one central processing unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

For example, when a hardware device is a computer processing device (e.g., a processor, Central At least one processor (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special-purpose computer processing device. In a more specific example, when the program code is loaded into a processor, the processor becomes programmed to perform the program code and operations corresponding thereto, thereby transforming the processor into a special-purpose processor. According to one or more example embodiments, at least one memory may include or store computer program code, and the at least one memory and the computer program code may be configured to, with at least one processor, cause an information processing device and/or an acquisition device to perform the necessary tasks. Additionally, the processor, memory and example algorithms, encoded as computer program code, serve as means for providing or causing performance of operations discussed herein.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording mediums, including the tangible or non-transitory computer-readable storage media discussed herein.

Even further, any of the disclosed methods may be embodied in the form of a program or software. The program or software may be stored on a non-transitory computer-readable medium and is adapted to perform any one of the aforementioned methods when run on a computer device (a device including a processor). Thus, the non-transitory, tangible computer-readable medium, is adapted to store information and is adapted to interact with a data processing facility or computer device to execute the program of any of the above mentioned embodiments and/or to perform the method of any of the above-mentioned embodiments.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for generating a graphical presentation of one or more distortion levels, the system comprising:

at least one memory configured to store instructions; and at least one processor configured to execute the instructions to cause the system to perform a distortion mapping sequence to generate a field map, the field map including spatial information related to anticipated distortions caused by variations of a static magnetic field, segment the spatial information into a plurality of distortion levels, the plurality of distortion levels including at least a first distortion level and a second distortion level, the first distortion level including field offsets of greater than a first threshold and less than a second threshold, and the second distortion level including first offsets greater than the second threshold, and display a graphical representation including the one or more distortion levels.

2. The system of claim 1, wherein the first threshold is about 200 Hz and the second threshold is about 2 kHz.

3. The system of claim 1, wherein the at least one processor is configured to execute the instructions to further cause the system to generate a localizer image based on a localizer scan; and generate the graphical representation of the field map by overlaying the plurality of distortion levels on the localizer image.

4. The system of claim 1, wherein each of the plurality of distortion levels is displayed in the field map.

5. The system of claim 1, wherein each of the plurality of distortion levels is displayed in a distinct color.

6. The system of claim 1, wherein the field map is masked based on thresholding using an output of the distortion mapping sequence.

7. The system of claim 1, wherein the at least one processor is configured to execute the instructions to further cause the system to adjust the spatial information based on discontinuities included in the field map to create a modified field map.

8. The system of claim 1, wherein the at least one processor is configured to execute the instructions to further cause the system to preconfigure the distortion mapping sequence based on at least one of an expected maximum off-resonance of the field map, a field strength, or a body part to be imaged.

9. The system of claim 1, wherein the plurality of distortion levels are metal distortion levels.

10. A method for generating a graphical presentation of one or more distortion levels, the method comprising:

performing a distortion mapping sequence to generate a field map, the field map including spatial information related to anticipated distortions caused by variations of a static magnetic field, segmenting the spatial information into a plurality of distortion levels, the plurality of distortion levels including at least a first distortion level and a second distortion level, the first distortion level including field offsets of greater than a first threshold and less than a second threshold, and the second distortion level including first offsets greater than the second threshold, and displaying a graphical representation of the one or more distortion levels.

11. The method of claim 10, wherein the first threshold is about 200 Hz and the second threshold is about 2 kHz.

12. The method of claim 10, further comprising:

generating a localizer image based on a localizer scan; and generating the graphical representation of the field map by overlaying the plurality of distortion levels on the localizer image.

13. The method of claim 10, wherein each of the plurality of distortion levels is displayed in the field map.

14. The method of claim 10, wherein each of the plurality of distortion levels is displayed in a distinct color.

15. The method of claim 10, wherein the field map is masked based on thresholding using an output of the distortion mapping sequence.

16. The method of claim 10, further comprising:

adjusting the spatial information based on discontinuities included in the field map to create a modified field map.

17. The method of claim 10, further comprising:

preconfiguring the distortion mapping sequence based on at least one of an expected maximum off-resonance of the field map, a field strength, or a body part to be imaged.

18. The method of claim 10, wherein the plurality of distortion levels are metal distortion levels.

19. A system for determining a plurality of distortion levels, the system comprising:

at least one memory configured to store instructions; and at least one processor configured to execute the instructions to cause the system to perform a distortion mapping sequence to generate a field map, the field map including spatial information related to anticipated distortions caused by variations of a static magnetic field, and segment the spatial information into a plurality of distortion levels, the plurality of distortion levels including at least a first distortion level and a second distortion level, the first distortion level including field offsets of greater than a first threshold and less than a second threshold, and the second distortion level including first offsets greater than the second threshold.

20. The system of claim 19, wherein the at least one processor is configured to execute the instructions to further cause the system to adjust one or more imaging protocols based on the plurality of distortion levels.

21. The system of claim 20, wherein the one or more imaging protocols are magnetic resonance imaging protocols.

22. A system comprising:

the system for generating a graphical presentation of the plurality of distortion levels according to claim 21; and an acquisition device configured to obtain magnetic resonance images based on the magnetic resonance imaging protocols.

23. The system of claim 19, wherein the plurality of distortion levels are determined for use in medical imaging.

* * * * *